United States Patent Office 3,251,873
Patented May 17, 1966

3,251,873
PROCESS FOR PREPARING DIARYL
CARBONATES
Raymond P. Kurkjy, Geneva, Switzerland, and Markus Matzner, Edison Township, and Robert J. Cotter, New Brunswick, N.J., assignors to Union Carbide Corporation, a corporation of New York
No Drawing. Filed July 3, 1962, Ser. No. 208,677
7 Claims. (Cl. 260—463)

The present invention relates in general to the preparation of diaryl carbonates, and more particularly it relates to a novel anhydrous catalytic process for reacting a phenol with a carbonate precursor to form diaryl carbonates.

Diaryl carbonates, typified by diphenyl carbonate, are well known chemical compounds which have heretofore been prepared by a number of different techniques. These methods include the reaction of phenols with phosgene in the presence of equimolar quantities of organic tertiary bases to neutralize the hydrogen chloride produced as a by-product. Aqueous sodium hydroxide has also been employed to neutralize the hydrogen chloride. Lewis acids have also been proposed as effective catalysts for the reaction. All of the aforesaid methods possess disadvantages which would desirably be eliminated. In some instances, particularly where quaternary ammonium salts are employed, the reaction rate is slow. Lewis acid catalysts in general give rise to colored reaction products. Many prior reaction systems produce reaction byproduct contaminants which must be removed before the diaryl carbonate is suitable for commercial usage.

It is therefore the general object of the present invention to provide a non-aqueous process for preparing diaryl carbonates which avoids the disadvantages of the prior known processes.

It is a more particular object to provide a novel catalytic process for preparing diaryl carbonates in which the desired product is free from undesirable color and in which the reaction by-products are volatile and easily removed.

These and other objects which will be obvious from the specification hereinafter are accomplished in accordance with the present process which comprises heating at elevated temperatures a reaction system comprising a monophenol, a carbonate precursor selected from the group consisting of phosgene and a phenyl monochloroformate, and a catalytic amount of a non-amphoteric metal catalyst.

Except where specifically designated otherwise, the term "a monophenol" is employed throughout the specification and in the appended claims in its generic sense to include hydroxybenzene, α- and β-naphthol, and the ring substituted analogs and homologs thereof wherein the substituents are inert toward the reaction system employed such as methyl substituted phenols such as o-cresol, m-cresol, p-cresol, nitro substituted phenols such as p-nitrophenol, chlorophenol, bromophenol, p-phenylphenol, p-propylphenol, α-ethylnaphthol, p-cyclohexylphenol, and the like. Preferably the phenol corresponds to the general formula (I)

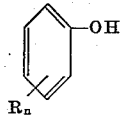

wherein R is a monovalent hydrocarbon radical free of aliphatic unsaturation and containing from 1 to 10 carbon atoms and $n$ has a value of 0 to 4 inclusive. Most particularly preferred are those species conforming to structural Formula I above wherein R is an alkyl group containing from 1 to 3 carbon atoms and $n$ has a value of from 0 to 1.

The metal catalyst suitably employed comprises the phenol salt of a metal selected from the group consisting of beryllium, magnesium, calcium, strontium, barium, and manganese. These phenates are readily prepared by reacting all of the phenols described hereinbefore with either the free metal or with an inorganic salt thereof such as the metal chloride, bromide, iodide, sulfate, nitrate, phosphate or silicate. In practice however, it is advantageous to form the phenate catalyst in situ by simply adding to the reaction system the free metal or inorganic metal salt.

By the term "phenate" is meant a salt of any of the above-specified metals and a monophenol in the same generic sense as applied to the monophenol reactants. Preferably the phenol precursor of the phenate is the same as the phenol employed as a reactant, as is necessarily the case when the metal phenate is prepared in situ. However since the quantity of phenate catalyst required is quite small the phenate can be derived from a phenol different from the phenol reactant without appreciable contamination of the desired diaryl carbonate product.

Preferred phenates, whether preformed or prepared in situ are those of magnesium and manganese. When prepared in situ the preferred metal salts are magnesium chloride and manganese chloride.

Catalyst concentration values are not narrowly critical, but in general form about 50 to about 5000 millimole of metal or metal compound per mole of phenol reactant provide adequate catalytic action. Preferably from about 50 to about 500 millimoles catalyst per mole phenol reactant is employed.

As the carbonate precursor, either phosgene or a chloroformate of a monophenol have been found to be suitable. Where diaryl carbonates having the same aryl moieties attached to the carbonate group are desired, the aryl chloroformate of the same phenol employed as the other essential constituent of the reaction system must necessarily be used. Where mixed diaryl carbonates are desired, however, the chloroformate of a monophenol different from the monophenol reactant accomplishes the desired result. Where even more variation in the diaryl carbonate product is desired, mixtures of different monophenols and different chloroformates can be utilized.

The chloroformate reactants are readily prepared by the reaction of phosgene with the desired monophenol in accordance with the process described in detail in our co-pending application Serial No. 208,673, filed July 3, 1962, and entitled "Catalytic Synthesis of Aryl Chloroformates."

Preferably the chloroformate reactants conform to the general formula (II)

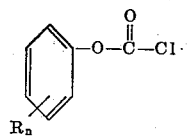

where R is a monovalent hydrocarbon radical containing from 1 to 10 carbon atoms and $n$ has a value of 0 to 4 inclusive. Most particularly preferred are those chloroformate species conforming to structural Formula II above wherein R is an alkyl group containing from 1 to 3 carbon atoms and $n$ has a value of from 0 to 1.

In the process embodiment wherein the phenol is contacted with phosgene, the order of mixing of the reactants and the catalyst is not a critical factor. It is preferred however, to first dissolve the monophenol in an inert organic solvent therefor, and thereafter add to the solution the catalyst followed by the phosgene.

Addition of phosgene is accomplished by any of the conventional techniques, i.e. it can be introduced into the reaction system in the form of a gas or in the form of a liquid, and can be added either in a plurality of small charges or all at once. Carrier inert gases and solvents can also be used if desired. For complete reaction the stoichiometric proportions of monophenol and phosgene are two moles phenol to one mole phosgene. Advantageously quantities of phosgene in excess of the stoichiometric amount are avoided. The reaction is not dependent however upon a critical balance of reactants. Large excesses of either reactant can be tolerated if economic factors are not an important consideration to the practitioner.

Optimum temperatures for the process depend in large measure upon the particular reactants involved and upon the heat stability of the diaryl carbonate product. In general however temperatures of from about 50° C. to about 250° C. have been successfully employed, which temperatures conform to the reflux temperature of the inert organic solvent utilized. Where higher reaction temperatures are required, the reaction system can be pressurized to raise the boiling point of the inert solvent. This technique has the disadvantage, however, of complicating the removal of the hydrogen chloride by-product.

Typical of the numerous inert solvents readily available are benzene, xylene, chlorobenzene, dichlorobenzene, carbon tetrachloride, chloroform, 1,2,4-trichlorobenzene, sym. tetrachloroethane, toluene, and the like. It is not necessary however that any solvent be present.

The foregoing reaction conditions apply with equal force to the process embodiment in which an aryl chloroformate is used as the carbonate precursor with the exception that the stoichiometric amounts of chloroformate is one mole per mole of monophenol. As in the embodiment using phosgene, it has been found advantageous to avoid molar excesses of chloroformate over the stoichiometric requirements.

The present invention is more fully illustrated by the following examples. It is to be understood that these examples are in no way intended to be limitative of the proper scope of the invention which is defined by the appended claims.

Example 1

To a glass reactor equipped with a thermometer, stirring means, a water-cooled and a Dry Ice cooled condenser in tandem, and a gas inlet tube, were charged 50.4 grams (0.535 mole) hydroxybenzene; 50.4 grams chlorobenzene; and 1.04 grams (0.11 mole) magnesium chloride (prepared by the high temperature fusion of the corresponding hexahydrate). The mixture was heated with stirring. When the temperature reached about 130° C., phosgene gas was bubbled into the reaction system. Phosgene addition was continued for a period of about 12 hours during which time about 55 grams had entered the system. Throughout the phosgene addition period hydrogen chloride was evolved rapidly and was permitted to leave the reactor through the reflux condenser system. When hydrogen chloride evolution had substantially ceased, dry nitrogen was passed through the reaction mass to remove all residual traces of phosgene and hydrogen chloride. The sparged mixture was thereafter filtered to remove insolubles and the filtrate subjected to vacuum distillation to isolate the product diphenyl carbonate (M.P. 77–79° C.). The product constituted 77.5 weight percent of the filtrate mixture.

Example 2

To a glass reactor equipped with a thermometer, stirring means, a water cooled reflux condenser and a nitrogen inlet tube were charged 4.7 grams (0.05 mole) hydroxybenzene, 25 ml. chlorobenzene, 7.8 grams phenyl chloroformate, and 0.6 gram (0.025 mole) magnesium turnings. The mixture thus formed was heated with stirring at a temperature of about 132° C. (reflux) under a dry nitrogen atmosphere for a period of about 21 hours. Throughout the heating period, and especially in the early stages, hydrogen chloride was rapidly evolved. When hydrogen chloride evolution had substantially ceased, the reaction mixture was cooled to room temperature, filtered to remove insolubles, and evaporated to dryness under vacuum. In all stages of the reaction the system was free of discoloration and a white residue of pure diphenyl carbonate (M.P. 77–79° C.) was isolated in a yield of 98.1 percent.

Example 3

Using the same apparatus as described in Example 2, a mixture of 5 grams (0.024 mole) α-naphthyl chloroformate, 3.48 grams (0.024 mole) α-naphthol, 0.35 gram (0.0036 mole) fused magnesium chloride, and 25 ml. o-dichlorobenzene was heated at reflux in a stream of dry nitrogen gas for a period of about 7 hours. The mixture was cooled, filtered, and evaporated to dryness under vacuum according to the same procedure set forth in Example 2. The residue, obtained after evaporation of the o-dichlorobenzene, was recrystallized from n-heptane to give a white crystalline di(α-naphthyl) carbonate M.P. 127–130° C.) in a yield of 88 percent.

Examples 4–6

Using substantially the same apparatus as described in Example 2, a series of three reactions were carried out using as the catalyst precursor a magnesium-loaded zeolitic molecular sieve (Zeolite Y described in D. W. Breck's U.S. Patent 3,130,007). In each of the reactions hydroxybenzene and phenyl chloroformate were reacted in an atmosphere of dry argon to yield diphenyl carbonate. Data and results are shown in tabular form below.

| Amount of Reagents | | | Catalyst (percent by wt. to the chloroformate) | Temp. and Time of Reaction | Yield and M.P. of the crude diphenyl carbonate | |
| --- | --- | --- | --- | --- | --- | --- |
| Phenol (moles) | Phenyl Chloroformate (moles) | Solvent | | | Percent | ° C. |
| 0.02 | 0.02 | Chlorobenzene 30 ml. | 5 | Reflux (−133° C.) 14.5 hrs. | 98 | 77–80 |
| 0.02 | 0.02 | s-Tetrachloroethane 30 ml. | 5 | Reflux (~146° C.) ~12 hrs. | 99.5 | 77–79.5 |
| 0.02 | 0.02 | o-Dichlorobenzene 30 ml. | 5 | Reflux (~180° C.) 6.5 hrs. | 98 | 78–80 |

The reaction mixture and product mass were at all times free of discoloration.

Example 7

The procedure, apparatus and formulation described in Example 2, were duplicated with the exception that 0.18 mole of $CaCl_2$ was employed as the calcium phenate precursor, the reaction temperature was 142° C. and the reaction period was about 20 hours. The diphenyl carbonate product was of high purity and entirely free of color.

Example 8

The phenate compounds of beryllium, strontium, barium, and manganese result from the reaction of beryllium sulfate, strontium nitrate, barium chloride, and manganous bromide respectively with phenol in reaction medium of chlorobenzene when the mixture is heated at reflux for a period of about 12 hours. The metal phenate exists in equilibrium with the metal salt present. Di-o-cresyl carbonate is produced by contacting o-cresol with phosgene at a temperature of about 155° C. in the presence of a quantity of the metal phenate-metal salt equilibrium mixture which contains about 0.2 mole equivalent of the metal.

The diaryl carbonates prepared by the process of this invention find extensive use as carbonate precursors in the preparation of polycarbonate resins by the method well known as ester-interchange.

What is claimed is:

1. The process for preparing a diaryl carbonate which comprises heating at a temperature of between about 50° C. and 250° C. and sufficient to cause the evolution of hydrogen chloride an anhydrous reaction mixture comprising a monophenol selected from the group consisting of hydroxy benzene, methyl-substituted phenol, nitro-substituted phenol, chlorophenol, bromophenol, α-naphthol and β-naphthol, a carbonate precursor selected from the group consisting of phosgene and a chloroformate of said monophenol, and a catalytic amount of at least one metal phenate of said monophenol, said metal being selected from the group consisting of beryllium, magnesium, calcium, strontium, and barium.

2. Process according to claim 1 wherein the carbonate precursor is a phenol monochloroformate.

3. Process according to claim 1 wherein the monophenol, carbonate precursor, and metal phenate catalyst are heated under refluxing conditions in an inert organic solvent medium.

4. Process according to claim 1 wherein the carbonate precursor is phosgene.

5. Process according to claim 4 wherein the monophenol has the formula

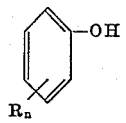

wherein R is a hydrocarbon radical free of aliphatic unsaturation and containing from 1 to 10 carbon atoms, and $n$ is an integer having a value of from 0 to 4 inclusive.

6. Process according to claim 5 wherein the monophenol is hydroxybenzene.

7. Process according to claim 5 wherein R is a methyl group and $n$ has a value of 1.

References Cited by the Examiner

UNITED STATES PATENTS

| | | | |
|---|---|---|---|
| 2,362,865 | 11/1944 | Tryon et al. | 260—463 |
| 3,017,424 | 1/1962 | Meyer et al. | 260—463 |

OTHER REFERENCES

Wagner et al.: "Synthetic Organic Chemistry," pages 483–484 (1953).

CHARLES B. PARKER, *Primary Examiner.*